Nov. 24, 1942.　　　　F. MOHLER　　　　2,303,169

CONTROL SYSTEM

Filed Jan. 1, 1942

Inventor:
Francis Mohler,
by Harry E. Dunham
His Attorney.

Patented Nov. 24, 1942

2,303,169

UNITED STATES PATENT OFFICE 2,303,169

CONTROL SYSTEM

Francis Mohler, Scotia, N. Y., assignor to General Electric Company, a corporation of New York Application January 1, 1942, Serial No. 425,328

5 Claims. (Cl. 172—239)

This invention relates to control systems, more particularly to systems for controlling the operation of electric motors, and it has for an object the provision of a simple, reliable, and improved control system of this character.

More particularly, the invention relates to control systems for electric motors which operate under conditions which produce very substantial ohmic, or RI, drops in the armatures of the motors, and a more specific object of the invention is the provision of means which will be sufficiently rapid to compensate for the ohmic drop of the motor armature during conditions of acceleration and deceleration. Another object of this invention is the provision of compensating means which can be readily adjusted to compensate for any desired percentage of the ohmic drop.

In carrying the invention into effect in one form thereof, an auxiliary adjustable voltage source is connected between the motor and its main source of supply. A voltage drop device is included in the connections between the auxiliary source and the motor armature. An adjustable potentiometer is connected across this auxiliary source and connections are provided for deriving from the potentiometer and voltage drop device a control voltage which is proportional to the difference of the voltage across the voltage drop device and an adjustable portion of the voltage of the auxiliary source, and this derived difference voltage is utilized to control the auxiliary source so as to compensate for the ohmic drop in the motor armature or a desired percentage of such ohmic drop.

Figure 1:
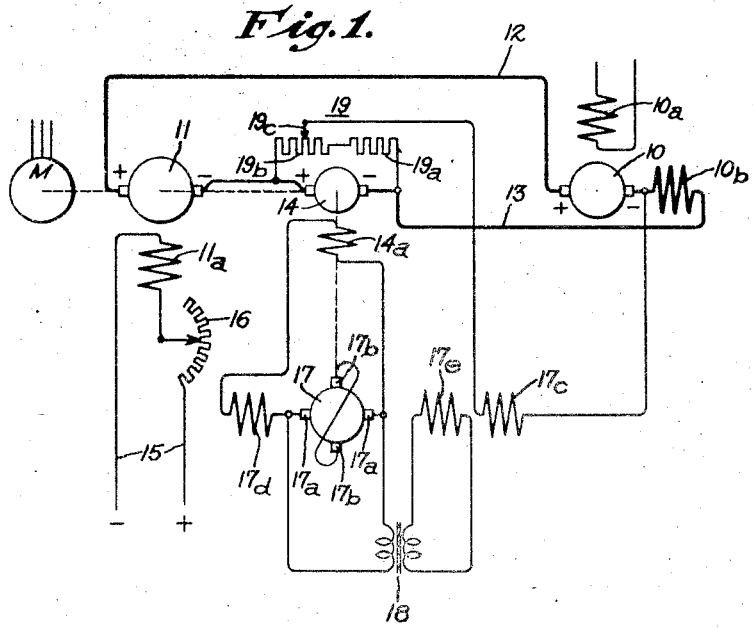
Figure 2:
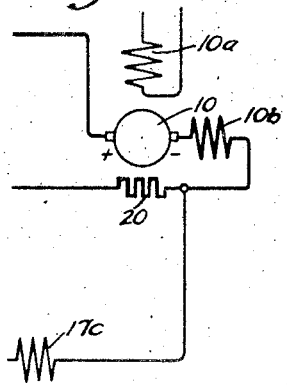

For a better and more complete understanding of the invention, reference should now be had to the following specification and to the accompanying drawing in which Figure 1 is a simple, schematic sketch of an embodiment of the invention and Figure 2 is a modification.

Referring now to the drawing, an electric motor 10 is supplied from a suitable source such as represented by the adjustable voltage generator 11 to which the armature of the motor 10 is connected by means of conductors 12 and 13. In certain industrial applications, such as the rolling of steel into a thin strip and winding the finished strip on a reel at high speed, it has become very important to compensate for the internal ohmic drop of the winding reel and mill stand motors in order to control the tension in the strip as desired during periods of acceleration and deceleration. It may be assumed, therefore, that the motor 10 is a motor utilized to drive the reel or mill stand of a steel strip mill or any other load in an industrial application in which it is important to compensate for the internal ohmic drop of the motor.

An auxiliary source of variable voltage, such for example as the generator 14, is included in the connections between the main supply generator 11 and the armature of the motor 10. As shown in the drawing, the armature of the supply generator 11, the armature of the auxiliary booster generator 14, and the armature of the motor 10 are connected in a series loop circuit.

Although the driving motor 10 may be of any suitable type, it is illustrated as a direct current motor having a separately excited field winding 10a and a series commutating field winding 10b.

The supply generator 11 is illustrated as an adjustable voltage generator provided with a separately excited field winding 11a which is supplied from a suitable source of excitation represented by the two supply lines 15. A rheostat 16 is included in the circuit of the separately excited field winding 11a for adjusting the excitation of the generator 11, thereby to adjust the voltage of the generator.

The booster generator 14 is provided with a separately excited field winding 14a which is excited from a special dynamoelectric machine 17 which is illustrated as an armature reaction excited dynamoelectric machine. As shown, the special dynamoelectric machine is provided with a pair of load brushes 17a which are connected to the external load which in this case is the field winding 14a of the booster generator, and is also provided with a second pair of brushes 17b which are arranged on an axis that is displaced 90 electrical degrees from the load brushes and are short circuited as indicated. The machine 17 is provided with a main control field winding 17c which is wound so that its magnetic axis coincides with the axis of the load brushes. The flux along this axis causes a current to flow in the short circuit, and this short circuit current causes the armature to produce a flux along the short circuit axis which generates the voltage that appears across the load brushes of the machine and causes current to flow in the external load circuit. The important characteristics of this armature reaction excited dynamoelectric machine are its exceptionally high speed of response, and its extremely high amplification factor, i. e., the ratio between the magnitude of the current flowing in the control field winding 17c and the magnitude of the current which flows in the output circuit of the machine.

The dynamoelectric machine 17 is provided with a compensating field winding 17d which is wound so that the axis of its magnetic field coincides with the load brush axis of the machine. This compensating field winding 17d is connected in the load circuit of the machine and is so designed and connected that it neutralizes the armature reaction produced by the load current substantially 100 per cent. Consequently the main control field winding 17c is only required to produce the amount of flux necessary to cause current to flow in the short circuit. As a result, the magnitude of the current which is required to flow in the main control field winding 17c is extremely small, and this accounts for the high amplification factor of the machine. For the purpose of preventing surges and overshooting, the machine 17 is provided with an antihunt field winding 17e which is arranged on the load brush axis of the machine in such a manner as to act differentially with respect to the compensating field winding. It is connected across the secondary winding of a transformer 18 the primary winding of which is connected across the load brushes of the machine 17.

The supply generator 11, the booster generator 14, and the armature reaction excited dynamoelectric machine 17 are driven by suitable driving means such as the induction motor M at a speed which is preferably substantially constant.

A potentiometer type rheostat 19 comprising a permanent resistor portion 19a and an adjustable resistor portion 19b is connected across the armature terminals of the booster generator 14. As shown, the adjustable portion of the potentiometer is provided with a movable contact arm 19c.

One terminal of the main control field winding 17c of the armature reaction excited dynamoelectric machine is connected to the contact arm 19c, the other terminal of the main control field winding is connected to a point in the series loop circuit between the armature of the motor 10 and its commutating field winding 10b. If desired, any other type of voltage drop device, such as a resistor, may be employed as the measure of current in the loop circuit instead of the commutating field winding 10b of the motor as indicated in Fig. 2 in which the resistor 20 is included in the loop circuit between the negative terminal of the booster 14 and the motor and in which the right-hand terminal of the control field winding 17c is connected to the right-hand terminal of the resistor 20.

With the connections illustrated in the drawing, the polarity of the armature terminals of the supply generator 11, the booster generator 14, and the main driving motor 10 may be assumed to be as indicated by the plus and minus signs in the drawing. In other words, the positive terminal of the generator 11 is directly connected to the positive terminal of the motor 10, and the negative terminal of the booster generator 14 is connected through the commutating field winding 10b to the negative terminal of the motor. From the foregoing it will be clear that the excitation applied to the main control field winding 17c of the armature reaction excited dynamoelectric machine 17 is a combination of the drop across the commutating field winding 10b of the motor and the drop across the booster generator or a selectable portion thereof. The polarity of the field produced by the main control field winding 17c of the dynamoelectric machine 17 is such that when the generator 11 is supplying current to the motor 10, the voltage drop across the commutating field winding 10b tends to increase the voltage of the dynamoelectric machine 17 which in turn tends to increase the voltage of the booster generator 14. However, the voltage drop across the armature of the booster generator 14 is in opposition to the voltage drop across the commutating field winding 10b, and when the booster voltage rises to a predetermined value, depending upon the position of the contact arm 19c of the potentiometer rheostat 19, a balance is established between the voltage drop across the commutating field winding 10b and the voltage drop across the selected portion of the potentiometer rheostat.

It may be assumed for the purpose of example that the motor 10 is of such size and design that when 100 per cent current is flowing through its armature, the internal voltage drop in the armature is 30 volts. If full compensation for this 30 volts is desired, the booster generator 14 must generate 30 volts. The relationship of the permanent and adjustable portions of the potentiometer rheostat 19 is so selected that when 100 per cent current is flowing through the armature of the motor 10, and the booster generator 14 is generating a voltage equal to the internal voltage drop of the armature of motor 10, the difference between the voltage drop across the commutating field winding 10b and the voltage drop across the permanent portion of the potentiometer rheostat 19 will produce just the correct amount of excitation of the control field winding 17c to maintain the balanced condition, i. e. the equality of the generated voltage of the booster generator 14 to the internal voltage drop of the armature of motor 10. In other words, when the voltage drop across the permanent resistor section 19a equals the voltage drop across the commutating field winding 10b, the booster generator will be generating 30 volts.

However, if the potentiometer rheostat is turned to a point on the adjustable resistor section 19b corresponding to 50 per cent compensation, the drop across the permanent resistor section 19a and that portion of the potentiometer rheostat included in the circuit with the contact arm would correspond to 15 volts. Under this condition, if the motor were carrying only half load, the compensation would be seven and one-half volts, but if the motor load increases to full load, the compensation will increase in proportion until at full load the booster generator is producing 15 volts. Thus, the potentiometer 19 can be adjusted to produce any desired percentage compensation and the booster will automatically adjust itself through the armature reaction excited dynamoelectric machine 17 to produce a compensating voltage corresponding to the per cent compensation desired.

Thus, the armature reaction excited dynamoelectric machine 17 regulates the booster generator 14 to maintain a definite voltage on the booster generator, depending upon the current in the motor armature and the adjustment of the potentiometer rheostat 19. As pointed out, the potentiometer rheostat can be adjusted for any desired per cent compensation, and this per cent compensation will be maintained irrespective of wide variations in the motor load.

The operation of the modified system shown in Fig. 2 is identical with the foregoing with the exception that the control field winding 17c is excited by a combination of the voltage drops across the resistor 20 and the booster 14 or a selectable portion thereof. This modification is useful for those cases in which the invention is used to compensate the RI drop of motors which do not have a commutating field winding.

Although in accordance with the provisions of the patent statutes this invention is described as embodied in concrete form and the principle thereof has been explained together with the best mode in which it is now contemplated applying that principle, it will be understood that the apparatus and connections shown are merely illustrative and that the invention is not limited thereto, since alterations and modifications will readily suggest themselves to persons skilled in the art without departing from the true spirit of this invention or from the scope of the annexed claims.

What I claim as new and desire to secure by Letters Patent of the United States, is:

1. A control system comprising in combination, a source of voltage, an electric motor supplied from said source, a booster generator connected between said source and said motor, a voltage drop device connected between said booster generator and said motor for producing a control voltage proportional to the current transmitted to said motor, an adjustable potentiometer connected across said booster generator for producing a control voltage proportional to the voltage of said booster generator, and means for controlling said booster generator to generate a voltage to compensate for the RI drop of said motor comprising a dynamoelectric machine for supplying the excitation of said booster generator and having a control field winding connected to be excited by the difference of said control voltages.

2. A control system comprising in combination, a main source of voltage, an electric motor supplied from said source, an auxiliary source of variable voltage connected between said main source and said motor, a voltage drop device connected between said motor and said auxiliary source, an adjustable potentiometer connected across said auxiliary source, electrical connections for deriving from said voltage drop device and said potentiometer a control voltage dependent upon the difference of the voltage across said voltage drop device and the voltage of said auxiliary source, and means responsive to said derived difference voltage for varying the voltage of said auxiliary source to compensate for the RI drop of the armature of said motor.

3. A control system comprising in combination, a source of voltage, an electric motor supplied from said source, a booster generator connected between said source and said motor, a voltage drop device connected between said motor and said booster generator, an adjustable potentiometer connected across the armature terminals of said booster generator, electrical connections for deriving from said voltage drop device and said potentiometer a control voltage dependent upon the difference of the voltage across said voltage drop device and the voltage of said booster generator, and means for compensating for the RI drop of said motor comprising a dynamoelectric machine for supplying the field excitation of said booster generator and having a control field winding energized by said derived control voltage.

4. A control system comprising in combination, a source of voltage, an electric motor supplied from said source, a booster generator connected between said source and said motor, a voltage drop device connected between one terminal of said booster generator and one terminal of said motor, a potentiometer comprising a permanent resistor and an adjustable rheostat connected in series relationship across said booster generator with one terminal of said permanent resistor connected to said one terminal of said booster generator, said adjustable rheostat having a movable contact arm, and means for compensating for the RI drop of said motor comprising a dynamoelectric machine for supplying field excitation to said booster generator and having a control field winding connected from said one terminal of said motor to said contact arm of said adjustable rheostat.

5. A control system comprising in combination, a source of voltage, an electric motor supplied from said source, a booster generator connected between said source and said motor, said motor having a commutating field winding connected in series between said booster generator and the armature of said motor, a potentiometer comprising a permanent resistor and an adjustable rheostat connected in series across the armature of said booster generator with one terminal of said permanent resistor connected to the booster terminal connected to said commutating field winding, and means for compensating for the RI drop of said motor comprising an armature reaction excited dynamoelectric machine having its load brushes connected to the field winding of said booster generator and having a control field winding connected from the movable contact of said adjustable rheostat to the armature terminal of said motor connected to said commutating field winding.

FRANCIS MOHLER.